(12) United States Patent
Lin

(10) Patent No.: US 8,027,166 B2
(45) Date of Patent: Sep. 27, 2011

(54) ELECTRONIC DEVICE

(75) Inventor: Shing-Huei Lin, Taipei County (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 349 days.

(21) Appl. No.: 12/485,132

(22) Filed: Jun. 16, 2009

(65) Prior Publication Data

US 2010/0124031 A1    May 20, 2010

(30) Foreign Application Priority Data

Nov. 14, 2008   (CN) .......................... 2008 1 0305555

(51) Int. Cl.
*H05K 7/12* (2006.01)

(52) U.S. Cl. ........ 361/747; 361/726; 361/732; 361/740; 312/223.3

(58) Field of Classification Search ................... 361/726, 361/732, 740, 747, 759; 312/223.2, 223.3
See application file for complete search history.

(56) References Cited

U.S. PATENT DOCUMENTS

| | | | |
|---|---|---|---|
| 6,737,862 B1* | 5/2004 | Godoy et al. | 324/207.21 |
| 7,274,554 B2* | 9/2007 | Kang et al. | 361/679.01 |
| 7,824,793 B2* | 11/2010 | Zuo et al. | 429/97 |
| 2007/0087263 A1* | 4/2007 | Ge et al. | 429/97 |
| 2008/0146295 A1* | 6/2008 | Jorgensen et al. | 455/575.3 |
| 2010/0302742 A1* | 12/2010 | Lin | 361/724 |
| 2010/0328861 A1* | 12/2010 | Liu | 361/679.01 |

* cited by examiner

*Primary Examiner* — Dameon Levi
(74) *Attorney, Agent, or Firm* — Altis Law Group, Inc.

(57) ABSTRACT

An electronic device includes a main body, a battery and a battery latching assembly mounted on the main body. The main body defines a receiving space to receive the battery. A first magnetic member is positioned in a portion of the battery. The battery latching assembly includes a second magnetic member and a resilient member. The second magnetic member is opposite to the first magnetic member. The resilient member resists the second magnetic member.

16 Claims, 5 Drawing Sheets

ELECTRONIC DEVICE

BACKGROUND

1. Technical Field

The present disclosure generally relates to an electronic device, and more particularly, to an electronic device with a removable battery.

2. Description of Related Art

A typical mobile phone includes a main body and a battery mounted on the main body. People usually take their mobile phones with them wherever they go. And so the phones may be subject to a lot of vibrations and impact from being stored loosely in a briefcase or purse, or dropped by accident. During the times of vibration and impact the battery may become loose in its compartment and the battery or the parts in and around the battery may be damaged or wear out more quickly.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
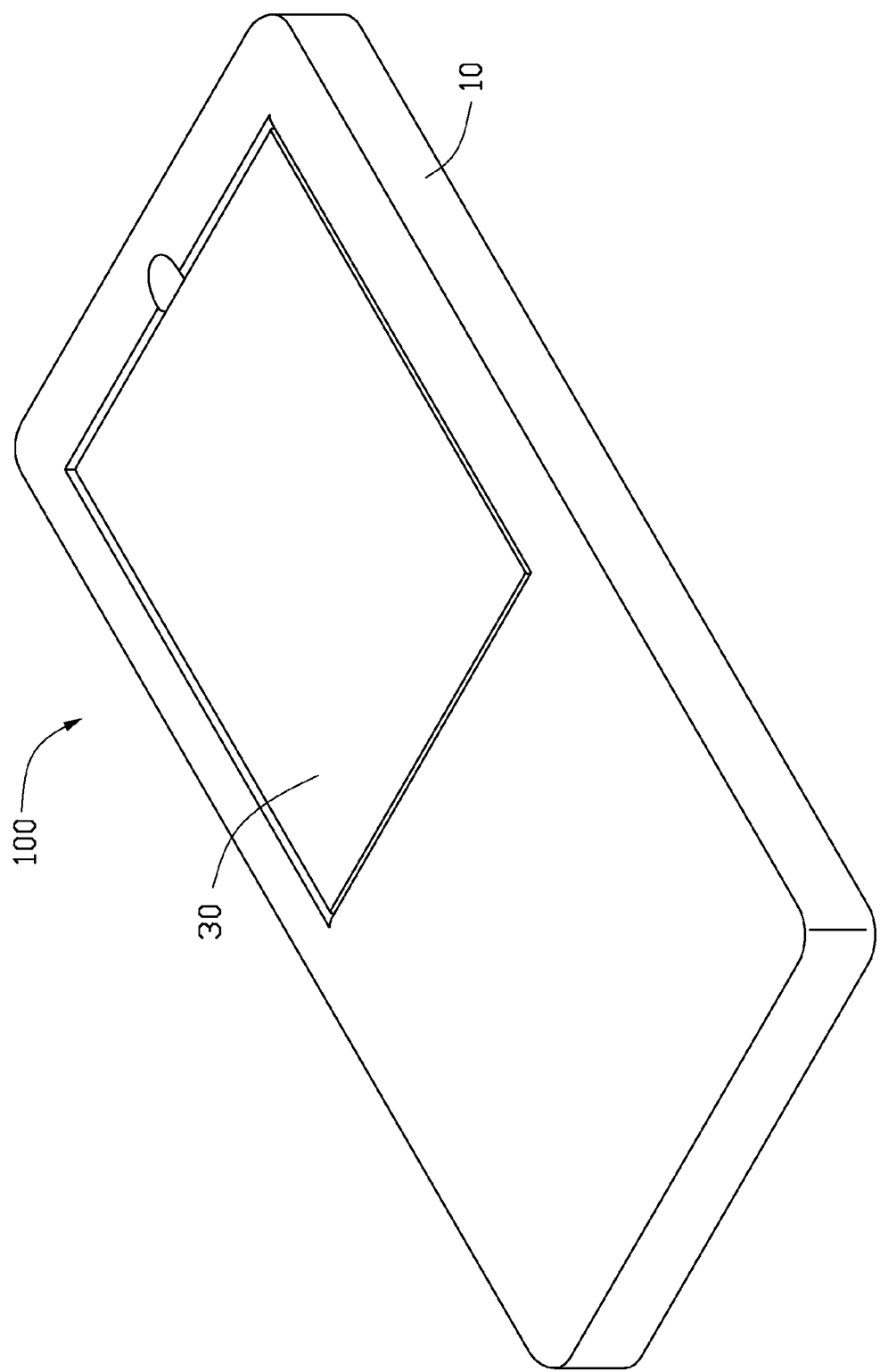
FIG. 1 is an assembled, isometric view of an embodiment of an electronic device.
Figure 2:
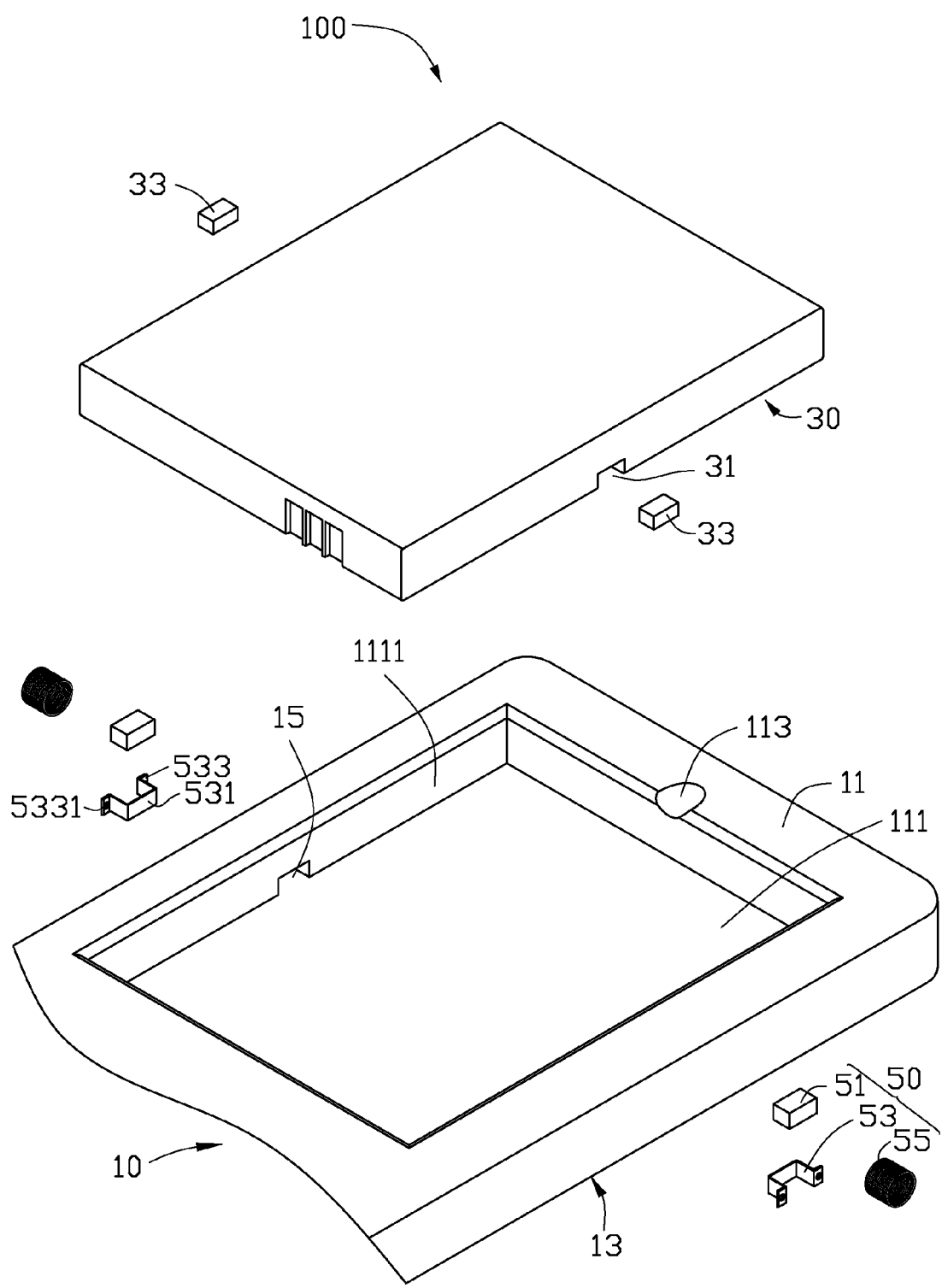
FIG. 2 is a partially exploded, isometric view of the electronic device of the FIG. 1.

An electronic device provided hereafter may be a notebook computer, a PDA (personal digital assistant), a mobile phone, and etc. In the illustrated exemplary embodiment, the electronic device is a sliding-type mobile phone. Referring to FIG. 1 and FIG. 2, an embodiment of an electronic device 100 includes a main body 10, a battery 30, and two battery latching assemblies 50 mounted on the main body 10.

The main body 10 has a first surface 11 and a second surface 13 opposite to each other. The main body 10 defines a receiving space 111 bounded by four sidewalls 1111. The main body 10 further includes a depressed portion 113 defined adjacent to one of the sidewalls 1111 in the first surface 11. The main body 10 defines two engaging slots 15 in two opposite sidewalls 1111 respectively.

Figure 3:
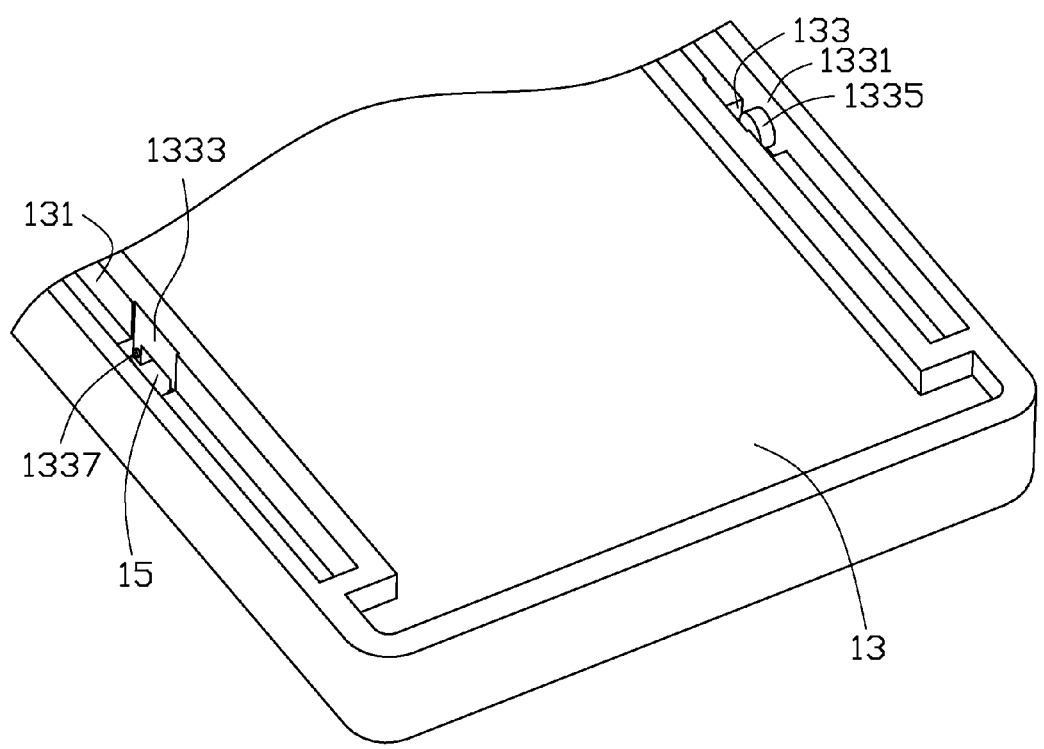
FIG. 3 is a partial, isometric view of the electronic device of a main body of the electronic device of the FIG. 2 viewed from another aspect.
Figure 4:
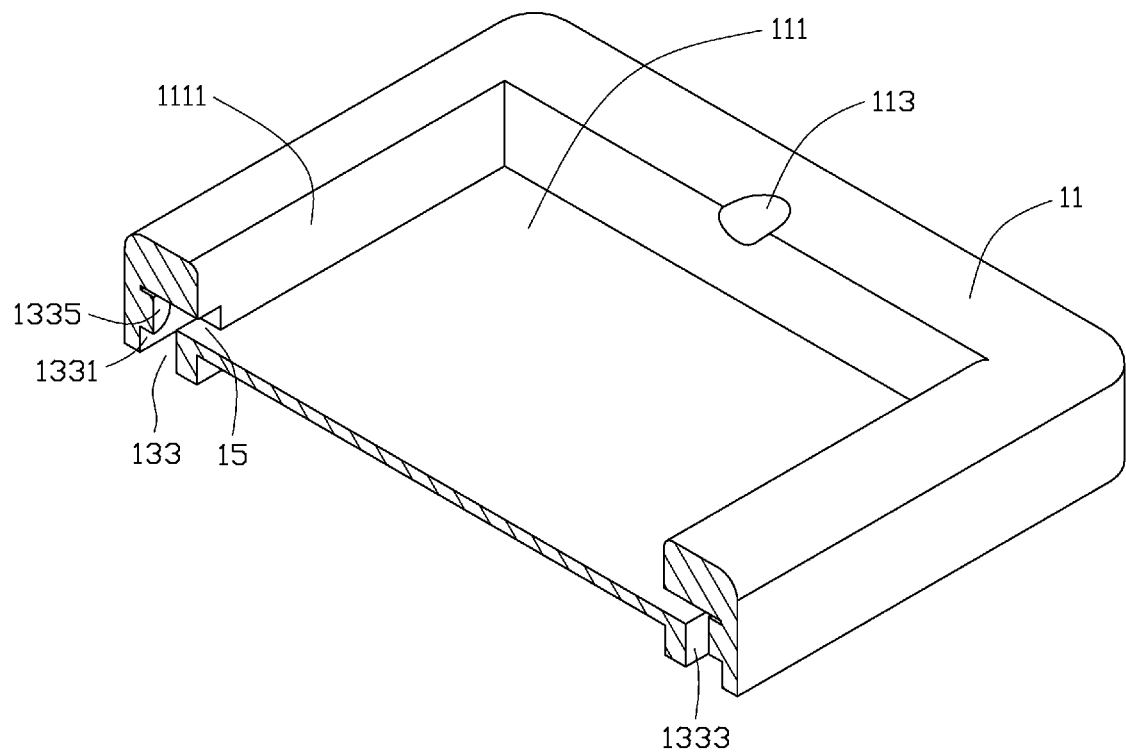
FIG. 4 is a cross-sectional view of the main body of the FIG. 2.

Referring to FIG. 3 and FIG. 4, the main body 10 defines two sliding slots 131 and two engaging spaces 133 in the second surface 13. Each of the engaging spaces 133 communicates with one of the two sliding slots 131 and one of the two engaging slots 15. Each of the two engaging spaces 133 is bounded by a first inner-wall 1331 and a second inner-wall 1333 facing each other. A guiding protrusion 1335 protrudes from the first inner-wall 1331, and two convex members 1337 extend from the second inner-wall 1333.

Figure 5:
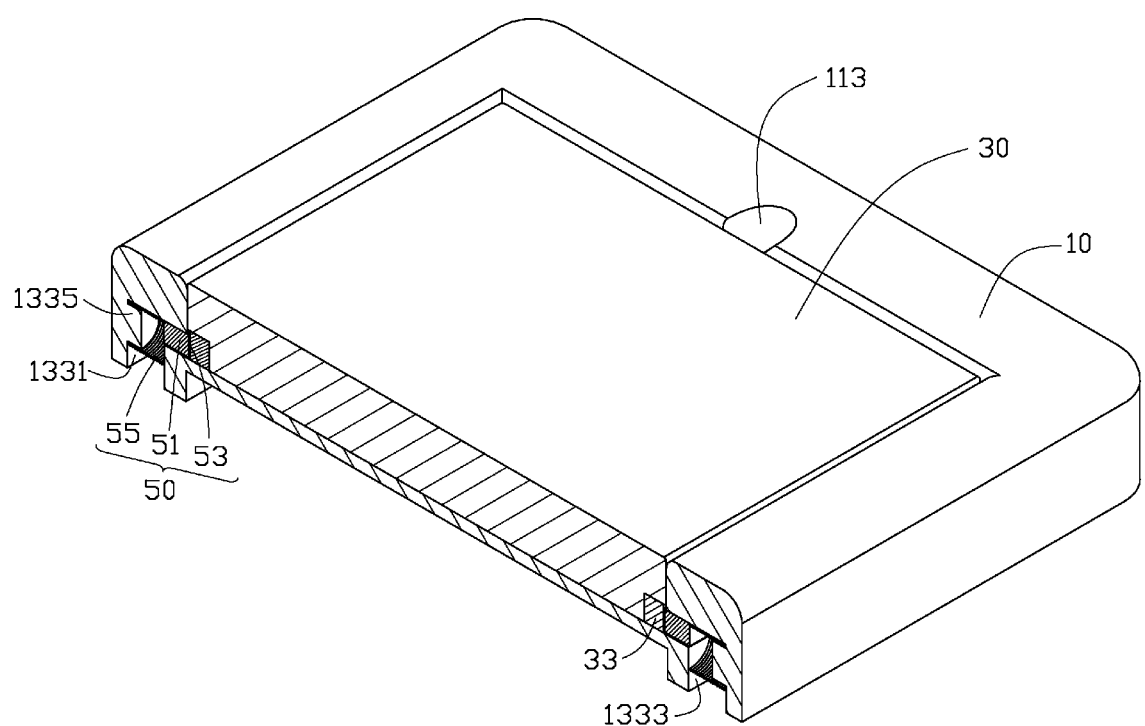
FIG. 5 is a cross-sectional view of the electronic device of the FIG. 1.

Referring to FIG. 2, FIG. 3 and FIG. 5, the battery 30 defines two notches 31 on two opposite sidewalls (not labeled). A first magnetic member 33 is received in each of the notches 31 and sunken from the sidewall of the battery 30. In the illustrated embodiment, the first magnetic member 33 is rectangular.

Each of the battery latching assemblies 50 includes a second magnetic member 51, a covering member 53, and a resilient member 55. The covering member 53 includes a covering portion 531 for covering the second magnetic member 51 and two connecting portions 533 connected to two ends of the covering portion 531. Each connecting portion 533 defines a hole 5331.

The second magnetic member 51 and the covering portion 531 of the covering member 53 are engaged in one of the engaging slots 15 of the main body 10. Both of the second magnetic member 51 and the covering member 53 partially extend into the receiving space 11. The covering portion 531 is substantially U-shaped, and the connecting portions 533 extends into the engaging spaces 133 of the main body 10, thus making the two convex members 1337 in the two engaging spaces 133 engage the hole 5331 of each connecting portion 533. The covering member 53 is made of elastic material. In the illustrated embodiment, the covering member 53 is made of rubber.

The resilient member 55 is received in the engaging spaces 133 of the main body 10. An end of the resilient member 55 sleeves over the guiding protrusion 1335 in the engaging spaces 133 and resists the first inner-wall 1331. The other end of the resilient member 55 resists the second inner-wall 1333 and an end of the second magnetic member 51, away from the covering portion 531. In the illustrated embodiment, the resilient member 55 is a compression spring.

When the battery 30 is mounted on the main body 10, ends of the first magnetic member 33 and the second magnetic member 51 facing each other have the different polarities. Therefore, an attractive magnetic force is generated between first magnetic member 33 and second magnetic member 51, thus steadily holding the battery 30 in the receiving space 111 of the main body 10. Both of the second magnetic member 51 and the covering member 53 partially extend into the notch 31, and resist the first magnetic member 33 with the push of the resilient member 55. When the battery 30 needs to be removed from the receiving space 11, a finger of a user extends in the depressed portion 113 and pulls the battery 30 out of the receiving space 111.

In the electronic device 100, the battery 30 is received and locked in the receiving space 111 by the magnetic force and the resilient force of the resilient member 55, when the battery suffers vibrations or impact, the resilient member can cushion the vibrations or impact, thus the battery is received in the receiving space 111 steadily and the battery 30 or the parts in or around the battery 30 can have a long life.

Since the battery is locked in the receiving space 111 by the magnetic force, high precision between components to precisely cooperate with each other is not needed. Therefore, manufacturing costs are lowered. In use, the covering member 53 and the resilient member 55 are compressed when the electronic device 100 suffers an impact or vibration. Since the impact or vibration generally occasionally occurs, the covering member 53 and the resilient member 55 are not easily damaged. Thus, the battery 30 is capable of being mounted on or removed from the main body 10 smoothly many times.

In addition, when the electronic device 100 suffers the impact or vibrations, the covering member 53 is also capable of cushioning the impact and vibrations, thus the battery 30 suffering little impact and vibration and it will be difficult for the battery 30 to fall out from the receiving space 111 of the main body 10. The covering portion 531 of the covering member 53 is a thin piece covering a face of the second magnetic member 51 facing the first magnetic member 33, and has little or no influence on the attractive magnetic force between the first magnetic member 33 and the second magnetic member 51.

Furthermore, since the first magnetic member 33 is positioned in the sidewall of the battery 30, when the battery 30 is received in the receiving space 111, the second magnetic member 51 and the covering member 53 are capable of partially extending into the notch 31, and resist the first magnetic member 33 by the elastic member 55. Therefore, the battery 30 is further locked in the receiving space 111.

In alternative embodiments, the hole 5331 of the connecting portion 533 of the covering member 53 may be omitted. Instead, for example, the connecting portion 533 may be adhered to the second inner-wall 1333 of one of the two engaging spaces 133. Correspondingly, the convex members 1337 on the second inner-wall 1333 may be omitted. The resilient member 55 may not be a compression spring. Instead, for example, the resilient member 55 may be an elastic piece. Correspondingly, the guiding protrusion 1335 is omitted. The covering portion 531 of the covering member 53 may be not U-shaped. Instead, for example, the covering portion 531 may be two thin pieces connecting with each connecting portion 533, and adhering to two opposite sidewalls (not labeled) of the second magnetic member 51. The ends of the resilient member 55 resisting the second inner-wall 1333 and the second magnetic member 51 may directly resist the second magnetic member 51. The covering member 53 may be omitted. Instead, for example, one end of the resilient member 55 may be connected to and resist the second magnetic member 51. The number of the battery latching assembly 50 may be changed, and the number of the engaging slots 15 and the engaging notches 133 may be changed correspondingly.

The engaging slot 15 and the engaging spaces 133 may be omitted. Instead, for example, the battery latching assembly 50 is engaged in the receiving space 111. In this state, the covering member 53 covers the second magnetic member 51 and the resilient member 55, and the connecting portion 533 of the covering member 53 is connected to one of the sidewalls 1111 of the receiving space 111. One end of the resilient member 55 resists the second magnetic member 51, and the other end of the resilient member 55 resists one of the sidewalls 1111. Correspondingly, the battery 30 defines two notches 31 lager than above-described so that when the battery 30 is received in the receiving space 111, the battery latching assembly 50 can be also received in the notches 31.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An electronic device, comprising:
   a main body defining a receiving space;
   a battery mounted on the main body;
   a first magnetic member positioned in a portion of the battery; and
   a battery latching assembly mounted on the main body and comprising a second magnetic member and a resilient member;
   wherein the ends of the second magnetic member and the first magnetic member facing each other have different polarities.

2. The electronic device of claim 1, wherein the main body defines an engaging slot in a sidewall of the receiving space, and the battery latching assembly is engaged in the engaging slot.

3. The electronic device of claim 2, wherein the resilient member resists the second magnetic member, and the second magnetic member of the battery latching assembly partially extends from the engaging slot into the receiving space.

4. The electronic device of claim 1, wherein the battery latching assembly further comprises a covering member covering the second magnetic member and connecting with the main body.

5. The electronic device of the claim 4, wherein the covering member comprises a covering portion and a connecting portion, and the covering portion is U-shaped.

6. The electronic device of the claim 1, wherein the main body further defines an engaging space communicating with the engaging slot, and the resilient member of the battery latching assembly is received in the engaging space.

7. The electronic device of the claim 6, wherein the main body forms a guiding protrusion and the resilient member is sleeved over the guiding protrusion.

8. The electronic device of the claim 1, wherein the battery defines a notch to receive the first magnetic member.

9. The electronic device of the claim 1, wherein the main body defines a depressed portion communicating with the receiving space.

10. An electronic device, comprising:
    a main body defining a receiving space;
    a battery mounted on the main body;
    a first magnetic member positioned in a portion of the battery; and
    a battery latching assembly mounted on the main body, comprising a second magnetic member, a covering member covering the second magnetic member, and a resilient member;
    wherein the main body defines an engaging slot in a sidewall of the receiving space, and the battery latching assembly is engaged in the engaging slot; the second magnetic member is connected to the main body by the covering member, and different magnetic poles of the first magnetic member and the second magnetic member face each other, an end of the resilient member resists the main body, and the other end of the resilient member resists an end of the second magnetic member away from the first magnetic member.

11. The electronic device of claim 10, wherein the main body has a first surface and a second surface opposite to each other, and the main body defines the receiving space in the first surface.

12. The electronic device of the claim 11, wherein the main body defines an engaging apace in the second surface, and the engaging space is communicated with the engaging slot on a sidewall of the receiving space, and the battery latching assembly is partially received in the engaging slot and partially received in the engaging apace.

13. The electronic device of the claim 12, wherein the second magnetic member of the battery latching assembly is partially extends out of the engaging slot.

14. The electronic device of the claim 10, wherein the battery defines a notch to receive the first magnetic member, and the first magnetic member is in the sidewall of the battery.

15. The electronic device of the claim 10, wherein the main body defines a depressed portion adjacent to a sidewall of the receiving space.

16. The electronic device of the claim 10, wherein the resilient member is a compression spring.

* * * * *